United States Patent
Gondi et al.

(10) Patent No.: US 9,947,983 B2
(45) Date of Patent: Apr. 17, 2018

(54) CONTACTLESS SIGNAL CONDUIT STRUCTURES

(71) Applicant: KEYSSA, INC., Campbell, CA (US)

(72) Inventors: Srikanth Gondi, Cupertino, CA (US); Lex Kosowsky, San Jose, CA (US); Gary D. McCormack, Tigard, OR (US); Eric Sweetman, Portland, OR (US); Bojana Zivanovic, Portland, OR (US)

(73) Assignee: KEYSSA, INC., Campbell, CA (US)

( * ) Notice: Subject to any disclaimer, the term of this patent is extended or adjusted under 35 U.S.C. 154(b) by 0 days.

(21) Appl. No.: 14/818,496

(22) Filed: Aug. 5, 2015

(65) Prior Publication Data
US 2017/0040660 A1    Feb. 9, 2017

(51) Int. Cl.
*H01P 3/00*    (2006.01)
*H01P 5/02*    (2006.01)
*H04B 5/02*    (2006.01)
*H04B 5/00*    (2006.01)
*H01P 11/00*    (2006.01)

(52) U.S. Cl.
CPC ............... *H01P 5/02* (2013.01); *H01P 3/00* (2013.01); *H01P 11/00* (2013.01); *H04B 5/0031* (2013.01); *H04B 5/02* (2013.01)

(58) Field of Classification Search
CPC ... H01P 5/00; H01P 5/121; H01P 5/12; H04B 5/02; H04B 15/00
USPC .................................. 333/24 R, 248, 254
See application file for complete search history.

(56) References Cited

U.S. PATENT DOCUMENTS

| | | | |
|---|---|---|---|
| 5,337,066 A * | 8/1994 | Hirata | H01Q 17/001 343/700 MS |
| 7,680,464 B2 * | 3/2010 | Pleva | H01P 5/107 333/208 |
| 2012/0290760 A1 * | 11/2012 | McCormack | H04B 5/0037 710/303 |
| 2013/0070817 A1 * | 3/2013 | McCormack | H04B 1/18 375/219 |
| 2013/0314182 A1 * | 11/2013 | Takeda | H01P 3/16 333/24 R |
| 2013/0328641 A1 * | 12/2013 | Komori | H01P 3/00 333/137 |
| 2014/0170982 A1 | 6/2014 | McCormack et al. | |
| 2015/0048907 A1 | 2/2015 | Almgren et al. | |
| 2015/0111496 A1 | 4/2015 | McCormack et al. | |
| 2015/0280827 A1 * | 10/2015 | Adiletta | H01P 3/10 398/116 |
| 2015/0288410 A1 * | 10/2015 | Adiletta | H04B 1/40 455/73 |

* cited by examiner

*Primary Examiner* — Dean Takaoka
(74) *Attorney, Agent, or Firm* — Van Court & Aldridge LLP (57) ABSTRACT

Conduit structures for guiding extremely high frequency (EHF) signals are disclosed herein. The conduit structures can include EHF containment channels that define EHF signal pathways through which EHF signal energy is directed. The conduit structures can minimize or eliminate crosstalk among adjacent paths within a device and across devices.

7 Claims, 7 Drawing Sheets

CONTACTLESS SIGNAL CONDUIT STRUCTURES

FIELD OF THE INVENTION

The present disclosure relates to contactless connector assemblies and more specifically to contactless signal conduits that define signaling pathways for extremely high frequency signals.

BACKGROUND

Advances in semiconductor manufacturing and circuit design technologies have enabled the development and production of integrated circuits (ICs) with increasingly higher operational frequencies in the non-wired realm. As a result, electronic products and systems incorporating such integrated circuits are able to provide much greater functionality than previous generations of products. This additional functionality has generally included the processing of increasingly larger amounts of data at increasingly higher speeds. The higher operational speeds [may be accompanied by] signal propagation that has a tendency to disperse in undesired ways that can cause signal loss and crosstalk.

BRIEF SUMMARY

Conduit structures for guiding extremely high frequency (EHF) signals are disclosed herein. The conduit structures can include EHF containment channels that define EHF signal pathways through which EHF signal energy is directed. The conduit structures can minimize or eliminate crosstalk among adjacent paths within a device and across devices.

In one embodiment, a system is provided that includes a housing having an interface that defines a contactless communications port for communicating EHF contactless signals, a substrate positioned within the housing a fixed distance from the interface, a first contactless communication unit (CCU) mounted on the substrate, and a conduit structure positioned over the first CCU and coupled to the substrate and the interface, the conduit structure comprising a first channel that spans the fixed distance and defines a contactless signal path between the first CCU and the interface.

In another embodiment, a contactless signal conduit for use in a device including a plurality of CCUs mounted to a substrate and an interface that defines a contactless communications port for communicating EHF contactless signals is provided. The contactless signal conduit can include a wave containment region comprising a plurality of EHF containment channels, wherein each EHF containment channel is associated with one of the CCUs and extends from a first surface to a second surface, and wherein an interior surface of each EHF containment channel comprises a conductive material.

In yet another embodiment, a method for assembling an apparatus including a plurality of CCUs mounted to a substrate and an interface that defines a contactless communications port for communicating EHF contactless signals is provided. The method can include securing a conduit structure to the substrate, the conduit structure comprising a plurality of EHF containment channels that are positioned over the plurality of CCUs, and mating the conduit structure to the interface such that the plurality of EHF containment channels span between the plurality of CCUs and the interface.

BRIEF DESCRIPTION OF THE DRAWINGS

Having thus described communication between devices in general terms, reference is now made to the accompanying drawings, which are not necessarily drawn to scale, and wherein:

DETAILED DESCRIPTION

Illustrative embodiments are now described more fully hereinafter with reference to the accompanying drawings, in which representative examples are shown. The disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of contactless communication between electronic devices and between sub-circuits within each device may be utilized in innovative and useful arrangements.

Such communication may occur between radio frequency communication units, and communication at very close distances may be achieved using EHF frequencies (typically, 30-300 GHz) between EHF communication units. An example of an EHF communications unit is an EHF comm-link chip. Throughout this disclosure, the terms comm-link chip, and comm-link chip package are used to refer to EHF antennas embedded in IC chips or packages.

The term "transceiver" may refer to a device such as an IC including a transmitter (Tx) and a receiver (Rx) so that the integrated circuit may be used to both transmit and receive information, such as data. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics may be channelized in contrast with a wireless link which typically broadcasts to several points.

Figure 1:
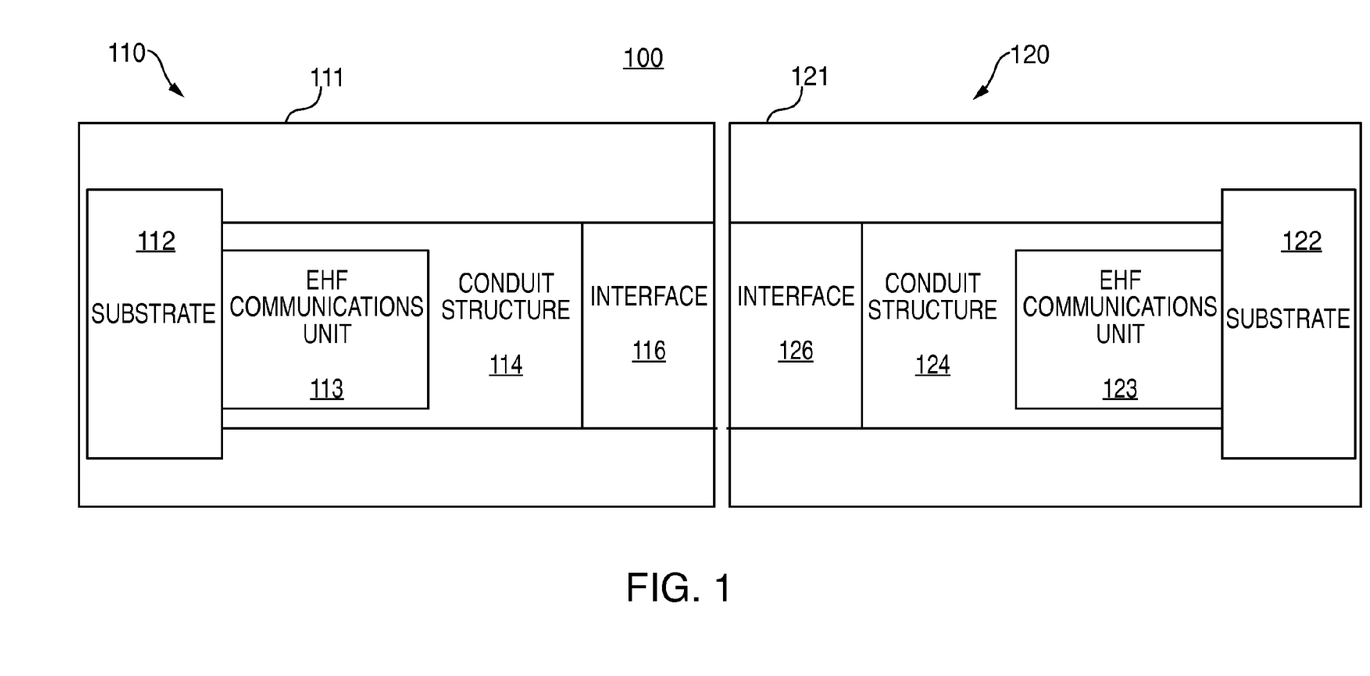
FIG. 1 illustrates an embodiment of a communication system.

FIG. 1 illustrates a communication system 100. As shown, system 100 may include a first device 110 configured to communicate with a second device 120. First device 110 may be configured to communicate with and/or connect to second device 120 and vice versa. Further, first device 110 and second device 120 can be any apparatus capable of connecting and communicating with each other. First device 110 may couple directly to device 120 via a direct coupling or via a physical coupling member (e.g., cable) that can couple the two devices together. For example, device 110 can be a device such as a mobile device or a computer, and device 120 can be a dongle designed to interface with the device 110. First device 110 may include housing 111 that encompasses substrate 112, one or more EHF contactless communication units (CCUs) 113, conduit structure 114, and interface 116. Similarly, second device 120 may include housing 121 that encompasses substrate 122, one or more EHF contactless communication units (CCUs) 123, conduit structure 124, and interface 126.

Housings 111 and 121 may represent the structure that forms a portion of the outer dimensions of devices 110 and 120. Housings 111 and 121 may be constructed from any suitable material or materials. Interface 116 may be a separate component that is coupled to housing 111. In some embodiments, interface 116 may be integrated within housing 111. For example, a portion of housing 111 can be designated as the interface. That is, the housing itself serves as the interface without the need for a separate component. Interface 116 may provide indicia and/or device coupling mechanisms (e.g., keying structure, magnets, etc.) for indicating the location of the interface and for connecting to the interface of another device.

Substrates 112 and 122 may be any suitable structure on which CCUs 113 and 123 can reside. For example, substrates may be a circuit board, a printed circuit board, or a flexible printed circuit board. CCUs 113 and 123 may be positioned on their respective substrates 112 and 122. It may be desired to ensure that a distance between the substrate and respective interfaces 116 and 126 is controlled to assist in managing signal propagation from the CCUs to the interface.

EHF CCUs 113 and 123 can be EHF transceivers capable of selectively transmitting and receiving EHF signals. When operating as a transmitter, the EHF CCUs may transmit an electromagnetic EHF signal, and when operating as a receiver, the EHF CCUs may receive an electromagnetic EHF signal. For example, in one embodiment, device 110 can include two EHF CCUs and device 120 can include two EHF CCUs. In device 110, a first EHF CCU may operate as a transmitter and a second EHF CCU may operate as a receiver. Similarly, device 120 may include first and second EHF CCUs that operate as receiver and transmitter, respectively. The transmitter EHF CCU of device 110 may transmit EHF signals to the receiver EHF CCU of device 120, and the transmitter EHF CCU of device 120 may transmit EHF signals to the receiver EHF CCU of device 110.

Conduit structures 114 and 124 may manage the propagation of EHF signals through one or more channels that exist between EHF CCUs and the interface by containing the EHF signal energy within the confines of each channel. All channels referred to herein may be EHF containment channels that guide and contain EHF signal energy. The dimensions of a radiation field associated with a first EHF CCU can potentially overlap the radiation field of one or more other EHF CCUs within a device. Such overlap can cause cross-talk or interference with EHF signaling. Crosstalk may occur when a receiver receives signals from different transmitters. For example, transmitters and receivers may coexist with devices 110 and 120. Thus, a receiver associated with device 110 may receive signals from transmitters on devices 110 and 120. Signals received from the transmitter on device 110 are undesired cross-talk, whereas the signals received from device 120 are desired signals to be received. Conduit structure 114 may provide one or more EHF containment channels or pathways that exist between EHF CCUs 113 and interface 116 to prevent the radiation fields of multiple EHF CCUs from overlapping each other. Similarly, conduit structure 124 may provide one or more EHF containment channels or pathways that exist between EHF CCUs 123 and interface 126. An EHF containment channel may exist for each EHF communication unit, and each channel is effectively isolated from each other to prevent cross-talk and signal degradation. Thus, the conduit structure can simultaneously direct EHF signals along desired pathways and prevent the EHF signals from traversing or entering undesired regions. Each channel of structures 114 and 124 can direct or focus EHF signal energy into a cross sectional area smaller than the transverse dimensions of the EHF CCU's radiation field. As a result, the EHF signals can be focused to travel along a desired signal path and away from undesirable paths.

The conduit structure can be secured within each device in a variety of ways. In one approach, conduit structure 114 may be coupled with substrate 112 and interface 116. In this approach, structure 114 may surround EHF CCU 113. If multiple CCUs 113 exist, structure 114 may include multiple channels that each independently surround a respective one of the CCUs. In another approach, conduit structure 114 can be mounted to interface 116 and be suspended over EHF CCU 113. In yet another approach, conduit structure 114 can be mounted to substrate 112 and extend in the direction of interface 116.

The conduit structures can be constructed from a combination of different materials to shape the direction of signal propagation and to mitigate EHF leakage (e.g. signal propagation in unintended paths), which may cause cross-talk. These materials can include EHF transmissive materials that are operable to facilitate propagation of EHF signals, EHF reflective materials that are operable to reflect EHF signals, and EHF absorptive materials that are operable to absorb EHF signals. Examples of transmissive materials can include plastics and other materials that are electrically non-conductive (i.e., dielectric). Reflective materials can include, for example, metals, metal alloys, metal foam, and other materials that are electrically conductive. Examples of absorptive materials can include, for example, magnetically loaded, rubber materials that are electrically non-conductive, but exhibit effective EHF dampening due to their high permittivity and permeability.

In some embodiments, the conduit structures can be constructed from just one of the different material types. For example, the conduit structure can be constructed from just the EHF transmissive material or just the EHF reflective material. In other embodiments, the structure can be constructed from two or more of the different material types. For example, one portion can be constructed from transmissive materials, and another portion can be constructed from reflective materials.

Conduit structures 114 and 124 may be constructed to exhibit any suitable shape, and can be constructed from a single component or multiple components. Regardless of shape and construction configuration, each conduit may include at least one signal collimating structure that has a channel existing within the collimating structure. Any suitable shape, including for example, rectangular, elliptical, or polygonal shapes of any suitable dimension may characterize each channel. The collimating structure may be constructed from, lined with, or coated with an EHF reflective material that may simultaneously guide EHF signals along the channel and prevent those same signals from penetrating the channel wall.

The conduit structure may also be constructed to account for tolerance variations in device stackup. Device stackup refers to the height of an assembly when all components of that assembly are put together. Device stackup can vary from one device to another due to variations in components used in the construction of the assembly. For example, the distance between the EHF units and the interface may vary depending on construction and variations in components. In one build, the distance may be x and in another build, the distance may be y, where y is greater than x. The conduit structure may include a compliant material that is designed to accommodate variations in stackup. The compliant material may be compressible and thus able to ensure that the conduit structure makes a secure and flush connection with the interface.

Figure 2:
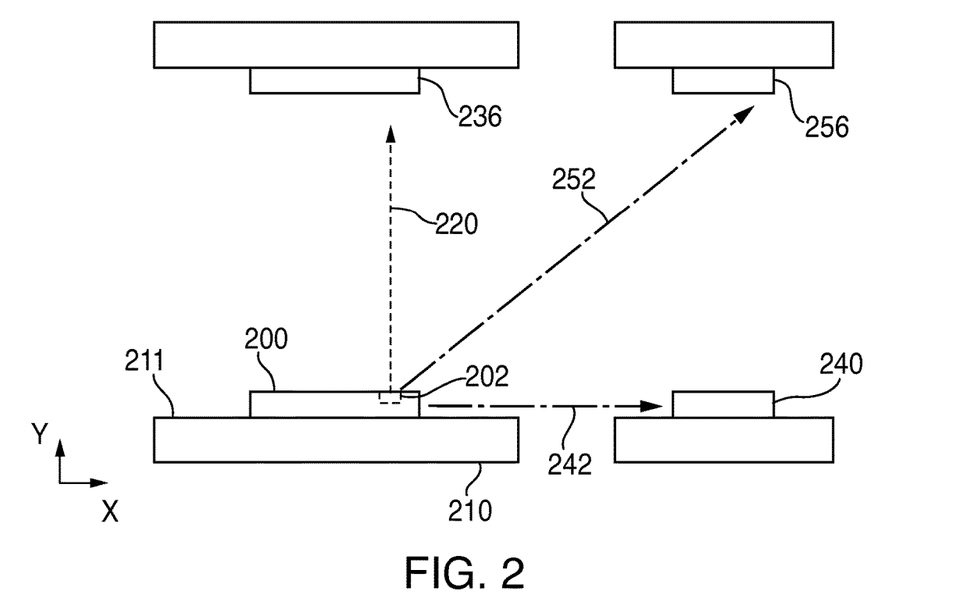
FIG. 2 shows a grossly simplified and illustrative communication unit mounted to a substrate, according to an embodiment.
Figure 3:
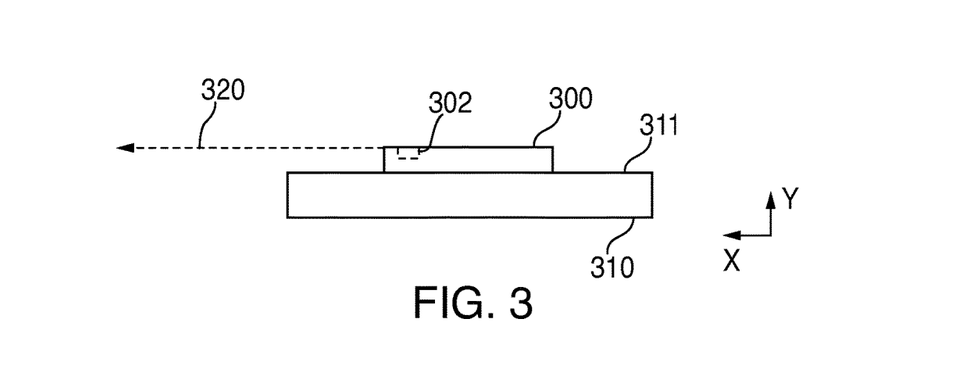
FIG. 3 shows another grossly simplified and illustrative communication unit mounted to a substrate, according to an embodiment.

FIG. 2 shows a grossly simplified and illustrative EHF CCU 200 mounted to substrate 210, according to an embodiment. CCU 200 may include transducer 202 that is designed to transmit contactless EHF signals in the direction of signal path 220. Path 220 projects in a direction perpendicular to surface 211 of substrate 210. In other words, path 220 projects in the Y-axis direction towards CCU 236. The direction of signal path 220 is merely illustrative. For example, the signal path can be directed in any suitable direction. For example, FIG. 3 shows a grossly simplified and illustrative EHF CCU 300 mounted to substrate 310. CCU 300 may include transducer 302 that is designed to transmit contactless EHF signals in the direction of signal path 320. Path 320 projects in a direction co-planar to surface 311 of substrate 310. In other words, path 320 projects in the X-axis direction.

Thus, although it may be desirable for EHF signals to be transmitted along a desired signal path (e.g., such as path 220 or 320), non-directed, free flowing EHF signal energy may emit in other directions, thereby resulting in radiation patterns that are not confined to the desired signal path. Non-directed transmission of EHF signals in undesired directions may cause cross-talk and multi-path crosstalk. Cross-talk may occur among adjacent CCUs in the same device. Such cross-talk may exist over-the-air and/or within circuit boards. This is illustrated in FIG. 2, which shows cross-talk EHF signal path 242 emanating from CCU 200 to CCU 240. Multi-path cross talk may occur when a CCU in a first device communicates with an unintended CCU in a second device. This is illustrated in FIG. 2, which shows multi-path cross talk signal path 252 emanating from CCU 200 to CCU 256. The non-directed transmission of EHF signals may also result in reduced signal strength, thereby potentially making it more difficult for receiving CCUs to capture the EHF signals. Various embodiments discussed herein are used to direct EHF signals along desired signal pathways (e.g., pathway 220) and minimize undesired pathways (e.g., pathways 242 and 252). Spurious radiation may also contribute to cross-talk and/or signal loss and can occur when a discontinuity exists in a channel containing the EHF signals. The breaks may occur at locations where two devices are mated together, for example.

Figure 4:
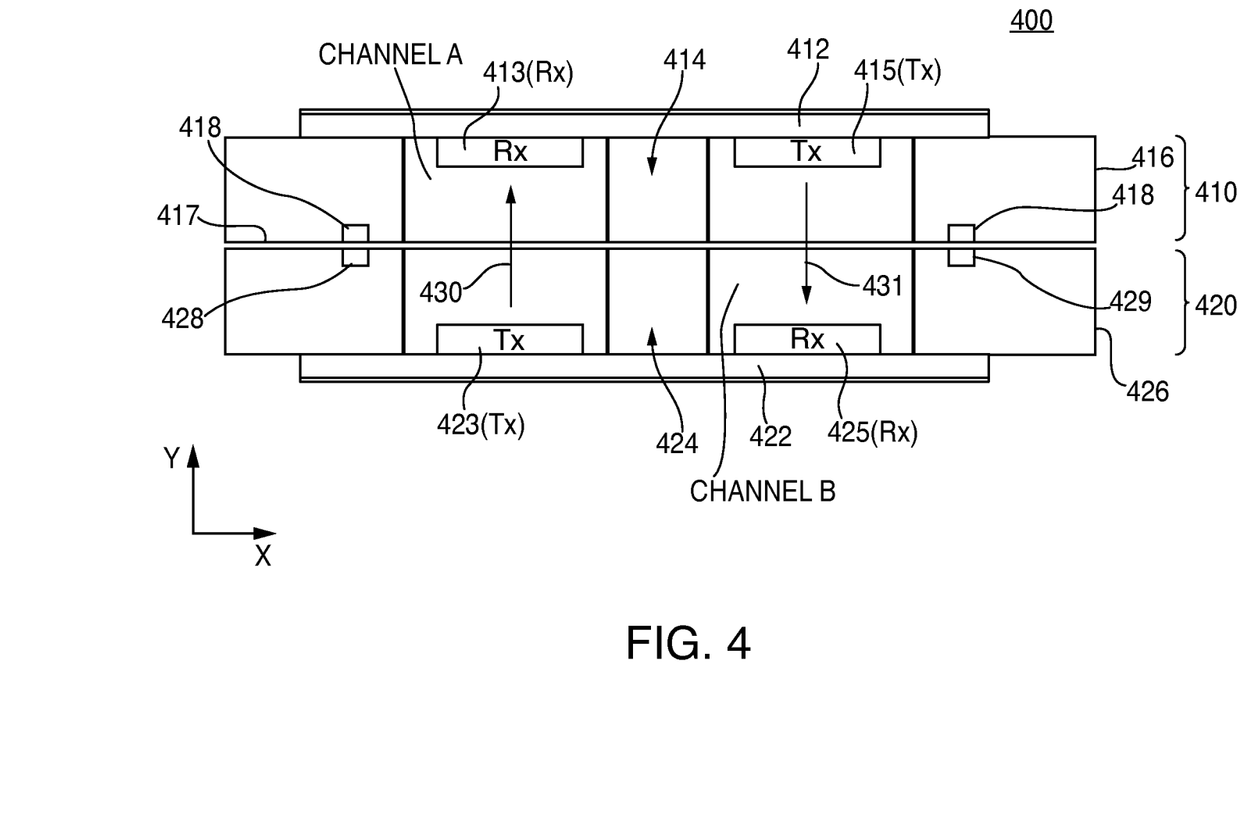
FIG. 4 shows a slightly more detailed view of a communication system, according to an embodiment

FIG. 4 shows a slightly more detailed view of communication system 400, and in particular, shows an illustrative partial cross-sectional view of system 400. System 400 may include many of the same components of system 100. As shown, first device 410 is positioned above and mated to second device 420. First device 410 shows substrate 412, CCU 413(Rx), CCU 415 (Tx), conduit structure 414, and interface structure 416. Interface structure 416 may be integrally formed with conduit structure 414, which can extend from substrate 412 to the outer surface 417 of interface 416. Conduit structure 414 may have two EHF containment channels, Channel A, which guides signals for CCU 413(Rx), and Channel B, which guides signals for CCU 415(Tx). Interface 416 can include alignment and proximity control structures 418 that may be used to connect and/or orient interface 416 with respect to interface 426. Second device 420 can be arranged and include the same components as first device 410, but this is not necessary. For example, device 420 can include substrate 422, CCU 423 (Tx), CCU 425 (Rx), conduit structure 424, interface structure 426, and alignment and proximity control structures 428. Conduit structure 424 may have two EHF containment channels, Channel A, which guides signals from CCU 423(Tx), and Channel B, which guides signals to CCU 425(Rx). An air gap may or may not exist between interfaces 416 and 426; however, a relatively small air gap is shown in the FIG. for illustrative purposes. This air gap may provide a gap or space for spurious EHF radiation to emanate.

CCU 423(Tx) may transmit contactless EHF signals in the direction of signal path 430 toward CCU 413(Rx), CCU 415(Tx) may transmit contactless EHF signals in the direction of signal path 431 toward CCU 425(Rx). The A and B channels formed as part of conduit structures 414 and 424 may assist in guiding and containing the EHF signals along paths 430 and 431 with minimal or no cross-talk or multi-path cross-talk.

Figure 5A:
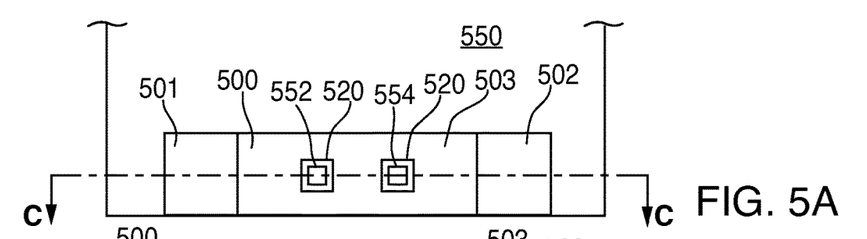
FIGS. 5A-5C show different views of a conduit structure mounted on a substrate, according to various embodiments.
Figure 5B:
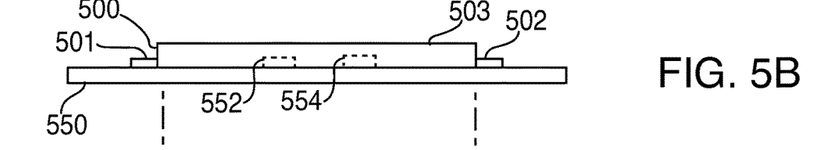
Figure 5C:
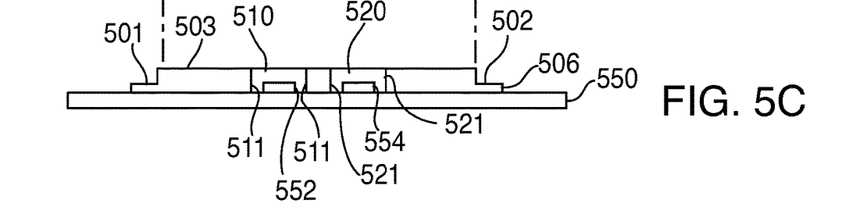

FIGS. 5A-5C show different views of a conduit structure 500 mounted on a substrate 550 according to various embodiments. In particular, FIG. 5A shows an illustrative top view, FIG. 5B shows an illustrative side view, and FIG. 5C shows an illustrative cross-sectional view taken along line C-C of FIG. 5A. FIGS. 5A-5C may be collectively referenced in the following discussion. As shown, EHF CCUs 552 and 554 are mounted on top of substrate 550 and conduit structure 500 is also mounted on top of substrate 550. Conduit structure 500 can include mounting regions 501 and 502, and wave containment region 503. Mounting regions 501 and 502 may include features that enable structure 500 to be secured to substrate 550. Wave containment region 503 may be integrally formed with mounting regions 501 and 502 and may have a height that exceeds the height of the regions 501 and 502. In some embodiments, the height of region 503 may be selected so that conduit structure 500 can mate directly with the interface (not shown) of the device housing or at least be positioned near that interface.

Wave containment region 503 may be positioned over EHF CCUs 552 and 554 to provide a combination of protection and EHF containment channels for the CCUs. The protective characteristic may be realized by the relative thickness of wave containment region 503 compared to the thickness of CCUs 552 and 554. Thus, in a shock event, wave containment region 503, in combination with regions 501 and 502, can absorb the shock and/or prevent a portion (e.g., housing) of the device from impinging on the CCUs.

Wave containment region 503 can include channels 510 and 520 that are positioned directly over EHF CCUs 552 and 554, respectively. The dimensions of channels 510 and 520 are shown to be larger than the dimensions of EHF CCUs 552 and 554, but it should be understood that this is merely illustrative and the channel dimensions may be smaller than the dimensions of the CCUs. Channels 510 and 520 may be lined or coated with a conductive metal material, shown as 511 and 521, respectively. The presence of the metal material within channels 510 and 520 isolates the EHF signals flowing through the channels from each other, thereby reducing or eliminating cross-talk. In one embodiment, conductive metal material 511 and 521 may be a solid metal fence or shield that covers the surface(s) of channels 510 and 520. The solid metal fences may be press fit into the channels or conduit structure 500 may be injection molded around the solid metal fences.

Figure 6A:
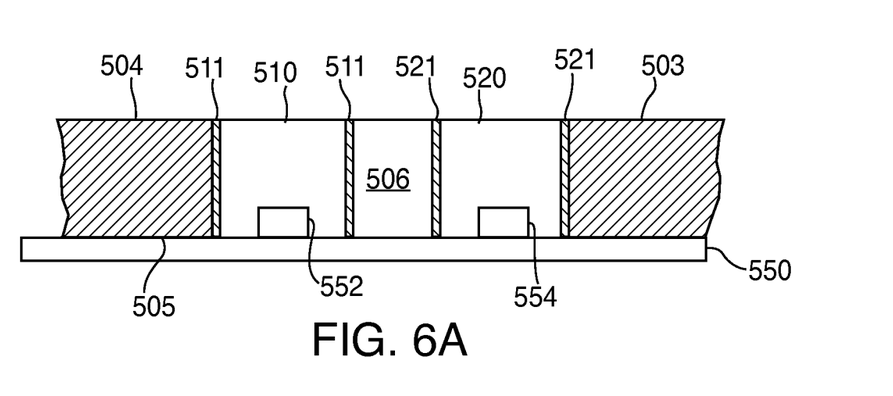
FIGS. 6A-6B show enlarged partial cross-sectional views of different illustrative metal coating variations, according to various embodiments.
Figure 6B:
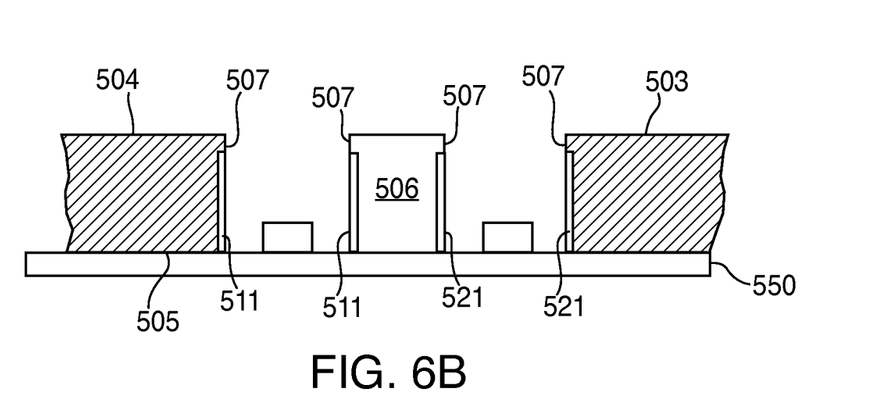
Figure 7A:
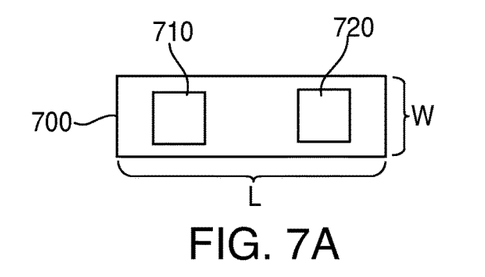
FIGS. 7A-7D show different views of an illustrative conductive foam member, according to various embodiments.
Figure 7B:
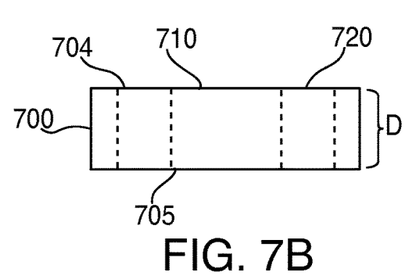
Figure 7C:
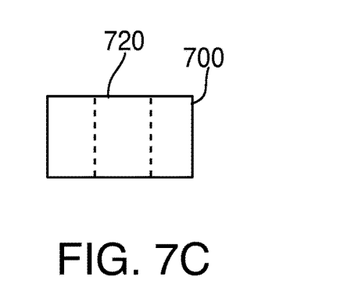
Figure 7D:
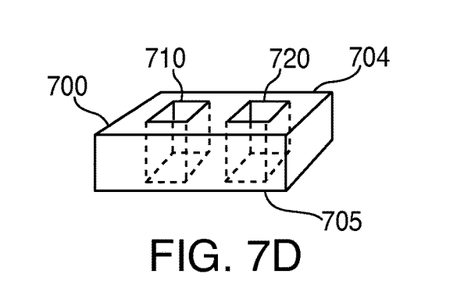

The degree to which the metal coating covers the surfaces of channels 510 and 520 may vary. Several variations are illustrated in FIGS. 6A-6B. Each of FIGS. 6A-6B show enlarged partial cross-sectional views of different illustrative metal coating variations, according to various embodiments. FIG. 6A shows that the metal coatings 511 and 521 span the entire height of wave containment region 503. That is, the top of metal coatings 511 and 521 may be flush with the top surface 504 of region 503 and the bottom of metal coatings 511 and 521 may be flush with bottom surface 505 of region 503. Moreover, the composition of region 506, which exists between channels 510 and 520, may be constructed from the same material as the rest of region 503 or it may be constructed from a different material.

FIG. 6B shows that metal coatings 511 and 521 extend from bottom surface 505 of region 503 to near top surface 504, but not quite all the way to top surface 504. Portions 507 of wave containment region 503 can occupy the space between top surface 504 and metal coatings 511 and 521. In region 506, portions 507 may form a "T" shape that occupies the space between channels 510 and 520. Portions 507 may serve as an abutment member that limits the positioning of metal coatings 511 and 521. For example, if metal coatings are shields that are press fit into channels 510 and 520, portions 507 would serve as a stops that limit travel of coatings 511 and 521 within the channels. Another approach is the opposite of that shown in FIG. 6B, wherein metal coatings 511 and 521 extend from the top surface 504 of region 503 to near bottom surface 505, but not quite all the way to bottom surface 505. In yet another approach that is not shown FIG. 6B, metal coatings 511 and 521 may be suspended within region 503 such that neither ends of coatings 511 and 522 are flush with either top surface 504 or bottom surface 505.

FIGS. 7A-7D show different views of an illustrative conductive foam member 700, according to various embodiments. In particular, FIGS. 7A-7D show illustrative top view, front side view, right side view, and perspective view, respectively. Foam member 700 can include any number of EHF containment channels. Only two such channels 710 and 720 are shown. Foam member 700 may have any suitable length, L, width, W, and depth, D dimensions and channels 710 and 720 may have any desired size and shape. Foam member 700 may be constructed from metalized foam. The conductive property of the metalized foam may exhibit EHF reflective properties suitable for guiding and containing EHF signals along a desired pathway. Since the surfaces of channels 710 and 720 are constructed from the metalized foam, each channel provides an EHF isolated pathway for guiding and containing EHF signals through member 700. It should be understood that any suitable compressible member may be used in place of foam member 700.

An advantage of foam member 700 is that it provides compliance to conform to different shapes and to account for tolerances in device assembly stackup. This compliance may enable foam member 700 to form hermetic EHF seals with the housing of structure(s) to which it is mounted. This can effectively reduce EHF leakage because the foam member 700 may remain in contact with the structure(s) even if dimension D changes. Foam member 700 may also provide shock protection for the EHF CCUs (not shown).

Figure 8:
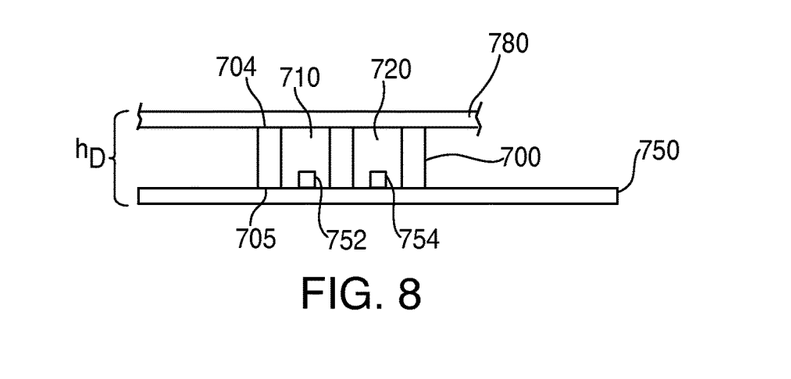
FIG. 8 shows the conductive foam of FIGS. 7A-7D mounted over CCUs, according to an embodiment.

FIG. 8 shows an illustrative partial cross-sectional view of foam structure 700 mounted to substrate 750 and housing 780 of a device. As shown, bottom surface 705 may be flushly mounted to substrate 750, and top surface 704 may be flushly mounted to housing 780. The flush mountings may create hermitic EHF seals that effectively enable EHF signals to travel through EHF containment channels 710 and 720 with minimal or no spurious radiation and reduced potential for cross-talk and signal loss. Foam member 700 may accommodate different height differences, $h_D$, existing between housing 780 and substrate 750 due to stackup variations. Foam member 700 may be secured in place using glue, adhesive(s) and/or mechanical press fit arrangements. FIG. 8 illustrates the use of foam member 700 as a stand-alone component for providing EHF containment channels for CCUs 752 and 754. That is, in this embodiment, foam member 700 is the only component being used as a conduit structure to guide EHF signals. In other embodiments, such as those discussed below, foam member 700 may be used in combination with at least one other component to provide another conduit structure embodiment.

Figure 9:
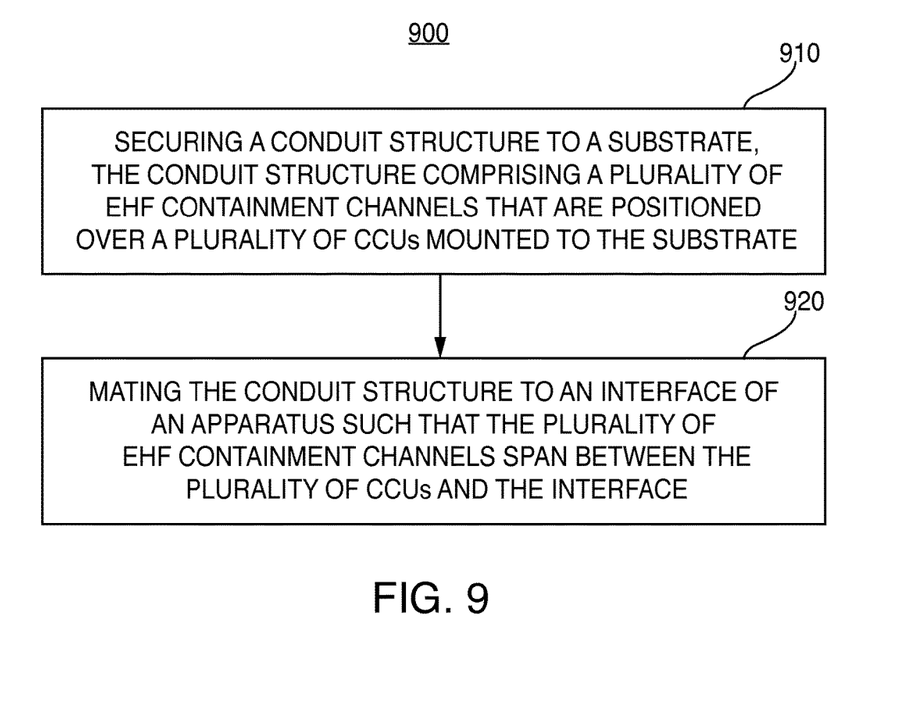
FIG. 9 shows an illustrative flowchart, according to an embodiment.

FIG. 9 shows an illustrative process 900 for assembling an apparatus that includes a conduit structure according to an embodiment. Starting at step 910, a conduit structure can be secured to a substrate having several CCUs mounted thereon, and the conduit structure can include several EHF containment channels that are positioned over the CCUs. At step 920, the conduit structure can be mated to an interface of an apparatus such that the plurality of EHF containment channels span between the CCUs and the interface. The conduit structure can embody variants discussed above in connection with FIGS. 5 and 6. For example, the conduit structure can include a wave containment region having the EHF containment channels incorporated therein, wherein each EHF containment channel is associated with one of the CCUs, and wherein an interior surface of each EHF containment channel includes a conductive material.

The conduit structure can embody variants discussed above in connection with FIGS. 7-8. For example, the conduit structure can include a conductive foam member that is positioned over the CCUs. The foam can define a plurality of EHF containment channels existing between the plurality of CCUs and the interface.

It should be understood that the steps shown in FIG. 9 are merely illustrative and that additional steps may be added, steps may be omitted, and the order of steps can be rearranged.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. xFurther, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A contactless signal conduit for use in a device comprising a plurality of CCUs mounted to a substrate and an interface that defines a contactless communications port for communicating extremely high frequency (EHF) contactless signals, the contactless signal conduit comprising:

a wave region constructed from a plastic material and comprising a plurality of EHF guiding channels, wherein each EHF guiding channel is associated with one of the CCUs and extends from a first surface to a second surface of the wave region, and wherein an interior surface of each EHF containment channel is lined with a conductive material such that the plastic material occupies space existing between the plurality of EHF guiding channels and the conductive material.

2. The contactless signal conduit of claim 1, wherein each EHF guiding channel defines an EHF signal path existing between the CCU associated with a particular EHF guiding channel and the interface.

3. The contactless signal conduit of claim 2, wherein the EHF signal path associated with a first guiding channel is substantially isolated from the EHF signal path associated with a second guiding channel.

4. The contactless signal conduit of claim 2, wherein the wave region is characterized by its ability to minimize cross-talk among EHF contactless signals transmitted through the plurality of EHF guiding channels.

5. The contactless signal conduit of claim 1, wherein the conductive material comprises a metal shield.

6. A method for assembling an apparatus comprising a plurality of contactless communication units (CCUs) mounted to a substrate and an interface that defines a contactless communications port for communicating extremely high frequency (EHF) contactless signals, the method comprising:

securing a conduit structure to the substrate, the conduit structure comprising a plurality of EHF containment channels that are positioned over the plurality of CCUs, wherein the conduit structure comprises a wave containment region constructed from a plastic material and comprising the plurality of EHF containment channels, wherein each EHF containment channel is associated with one of the CCUs, and wherein an interior surface of each EHF containment channel is lined with a conductive material such that the plastic material occupies space existing between the plurality of EHF guiding channels and the conductive material; and mating the conduit structure to the interface such that the plurality of EHF containment channels span between the plurality of CCUs and the interface.

7. The method of claim 6, wherein the conductive material is a compliant structure constructed from a conductive foam.

* * * * *

UNITED STATES PATENT AND TRADEMARK OFFICE
CERTIFICATE OF CORRECTION

PATENT NO. : 9,947,983 B2
APPLICATION NO. : 14/818496
DATED : April 17, 2018
INVENTOR(S) : Gondi et al.

Page 1 of 1

It is certified that error appears in the above-identified patent and that said Letters Patent is hereby corrected as shown below:

In the Specification

In Column 2, Line 16, delete "embodiment" and insert -- embodiment; --, therefor.

In Column 9, Line 28, delete "xFurther," and insert -- Further, --, therefor.

In the Claims

In Column 10, Lines 31-33, Claim 6, delete "a plurality of EHF containment channels that are positioned over the plurality of CCUs, wherein the conduit structure comprises".

In Column 10, Line 35, Claim 6, delete "the" and insert -- a --, therefor.

In Column 10, Lines 40-41, Claim 6, delete "guiding" and insert -- containment --, therefor.

Signed and Sealed this
Second Day of June, 2020

Andrei Iancu
*Director of the United States Patent and Trademark Office*